United States Patent
Shim

[11] Patent Number: 6,043,979
[45] Date of Patent: Mar. 28, 2000

[54] HEAT-DISCHARGING LCD MONITOR

[75] Inventor: Jae-Soo Shim, Kyungki-do, Rep. of Korea

[73] Assignee: SamSung Electronics Co., Ltd., Kyungki-do, Rep. of Korea

[21] Appl. No.: 08/985,626

[22] Filed: Dec. 4, 1997

[30] Foreign Application Priority Data

Dec. 4, 1996 [KR] Rep. of Korea ............... 96-61632

[51] Int. Cl.[7] ............... G06F 1/20; H05K 7/20
[52] U.S. Cl. ............... 361/695; 361/687
[58] Field of Search ............... 361/687–695, 361/681, 683, 682; 248/917–923

[56] References Cited

U.S. PATENT DOCUMENTS

| | | |
|---|---|---|
| 4,084,213 | 4/1978 | Kirchner et al. ............... 361/687 |
| 4,751,872 | 6/1988 | Lawson, Jr. . | |
| 4,952,925 | 8/1990 | Haastert . | |
| 5,163,870 | 11/1992 | Cooper . | |
| 5,252,955 | 10/1993 | Davis et al. . | |
| 5,381,043 | 1/1995 | Kohiyama et al. ............... 361/687 |
| 5,398,991 | 3/1995 | Smith et al. ............... 248/919 |
| 5,432,526 | 7/1995 | Hyatt . | |
| 5,583,529 | 12/1996 | Satou . | |
| 5,606,341 | 2/1997 | Aguilera . | |
| 5,623,392 | 4/1997 | Ma ............... 361/681 |
| 5,684,674 | 11/1997 | Yin . | |
| 5,869,919 | 2/1999 | Sato et al. ............... 361/688 |

*Primary Examiner*—Lynn D. Feild
*Attorney, Agent, or Firm*—Robert E. Bushnell, Esq.

[57] ABSTRACT

A flat-display panel monitor discharges excessive heat generated by its main PCB using an air duct and a fan to force air through the monitor housing. This allows for greater cooling than that naturally occurring through convection. The apertures in the monitor are also covered with filters to reduce the level of contaminants that enter the monitor's housing.

34 Claims, 3 Drawing Sheets

HEAT-DISCHARGING LCD MONITOR

This application makes reference to, incorporates the same herein, and claims all rights accruing thereto under 35 U.S.C. §119 through my patent application entitled Heat Dischargeable LCD Monitor earlier filed in the Korean Industrial Property Office on the 4th day of December 1996 and there duly assigned Ser. No. 1996/61632.

BACKGROUND OF THE INVENTION

1. Field of the Invention

The present invention relates to liquid crystal display monitors and, more specifically, to a liquid crystal display monitor that discharges internally generated heat.

2. Background Art

With the increasing amounts of information that aremanaged and displayed using computers, the development of higher quality monitors has been an area of extensive research. This research has led to improvements in the miniaturization of internal components, in the reduction of monitor thickness, and in the quality of picture displayable by amonitor. Today, older monitors, such as the heavy and bulky cathode ray tube (CRT), are being replaced with compact liquid crystal display monitors (LCD) monitors that are designed using a combination of LCD and semiconductor techniques.

A LCD monitor may be constructed using: an LCD display unit, a stand unit, and a stand-display interface. The LCD display unit's front and rear housings are assembled into a single housing containing both an LCD and a printed circuit board (PCB). The stand unit supports the display unit on a support surface and includes a plurality of connectors for power and signal cables. During operation many circuit parts on the PCB give off heat. Unless this internally generated heat is removed from the LCD monitor, the heat generating circuit parts that are mounted on the monitor's PCB will undergo increased wear and the lifespan of the monitor will be reduced. Different techniques have been developed to discharge heat from a monitor as shown, by way of example, in U.S. Pat. No. 4,952,925 to Haastert entitled Projectable Passive Liquid-Crystal Flat Screen Information Centers, U.S. Pat. No. 5,252,955 to Davis entitled Liquid-Crystal Display Unit for Electronic Directory, U.S. Pat. No. 5,583,529 to Satou entitled Portable Apparatus Having a Flat Panel Tvpe Display Unit, U.S. Pat. No. 5,432,526 to Hyatt entitled Liquid Crystal Display Having Conductive Cooling, U.S. Pat. No. 5,606,341 to Auguilera entitled Passive CPU Cooling and LCD Heating for a Laptop Computer, U.S. Pat. No. 5,163,870 to Cooper entitled Protective Dust Cover for Computer Components, U.S. Pat. No. 4,751,872 to Lawson, Jr. entitled Ventilation System, and U.S. Pat. No. 5,684,674 entitled Circuit Board Mounting Brackets With Convective Air Flow Apertures.

I have observed that most monitors rely on naturally occurring convection to discharge internally generated heat. This method has become less effective as the size of monitors has been reduced along with the corresponding amount of space inside the monitor housing. I expect that a monitor that effectively discharges internally generated heat will increase the lifespan, allow further miniaturization, increase reliability, and increase the market competitiveness of monitors.

SUMMARY OF THE INVENTION

Accordingly, it is an object of the present invention to provide an improved LCD monitor.

It is another object to provide a flat-display panel monitor that effectively discharges internally generated heat.

It is still another object to provide a flat-display panel monitor that has an increased operational lifespan.

It is yet another object to provide a flat-display panel monitor that has increased reliability and a corresponding increased market competitiveness.

It is still yet another object to provide a flat-display panel monitor that can be further miniaturized.

These and other objects may beachievedby constructing a flat-display panel such as an LCD monitor providing a variable visual image driven by video signals. The display has an intake aperture in the bottom of its housing and an exhaust aperture in the rear of the housing. A fan is positioned over the intake aperture to force more air through the monitor housing to achieve more cooling than that naturally available through convection. As the air passes over the heat generating parts on the PCB heat is transferred from the PCB to the air that is then expelled. Thus, the internal components in the LCD monitor are kept at a lower temperature. Both the intake aperture and the exhaust aperture can have filters positioned over them

BRIEF DESCRIPTION OF THE ATTACHED DRAWINGS

A more complete appreciation of this invention, and many of the attendant advantages thereof, will bereadily apparent as the samebecomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
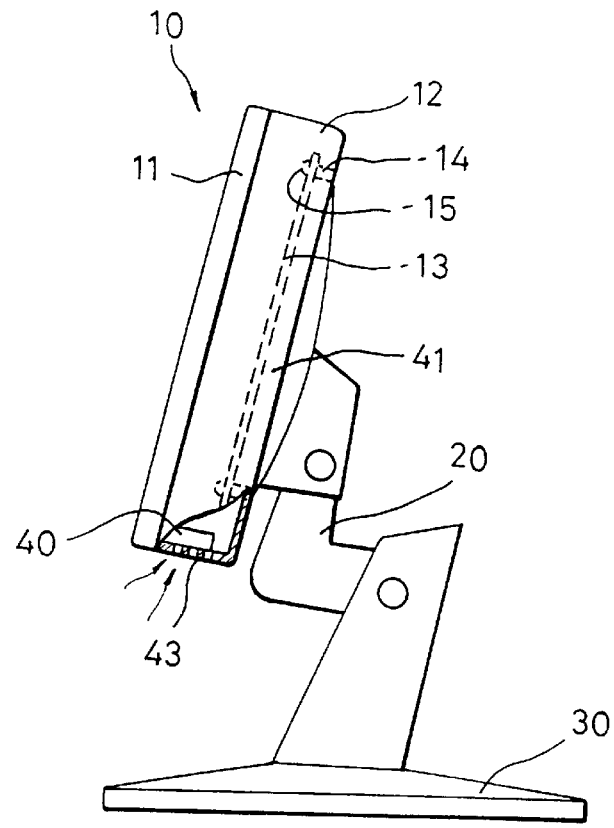
FIG. 1 is a side view of an LCD monitor and a built in heat-ischarge device constructed according to the principles of the present invention.

Turning now to the drawings, FIG. 1 illustrates a flat-display panel such as an LCD monitor for displaying varying visual images in response to video signals. The monitor may be constructed with main body 10, L-shaped member 20, and stand 30 that is connected to main body 10 by L-shaped member 20. Main PCB 13 is attached along rear housing 12 by fasteners. Fastener 15 is engaged with boss 14, thus securing main printed circuit board 13 to rear housing 12 while maintaining a space betveen the inner rear housing surface 12a and the main PCB. This space forms air flow passage 41 through which air is blown to cool the heat generating circuitry.

Figure 2:
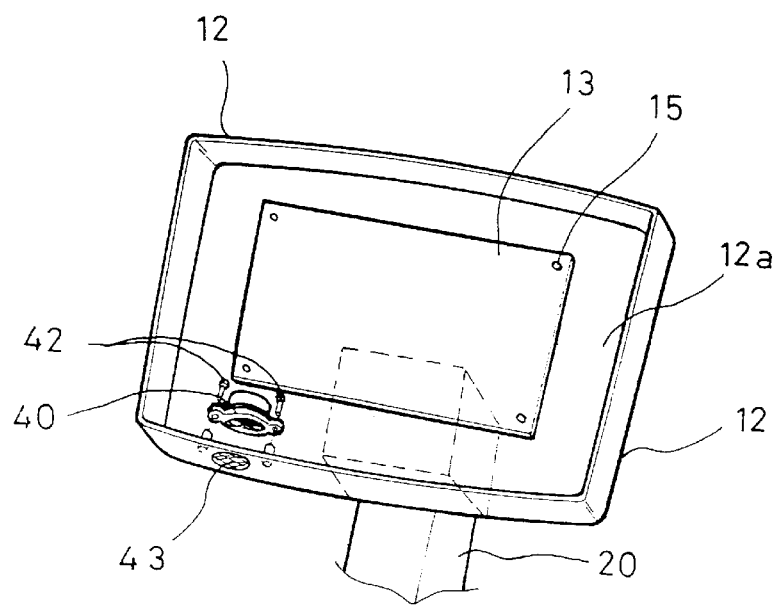
FIG. 2 is a perspective view of a salient feature of the heat-discharge device of FIG. 1.
Figure 3:
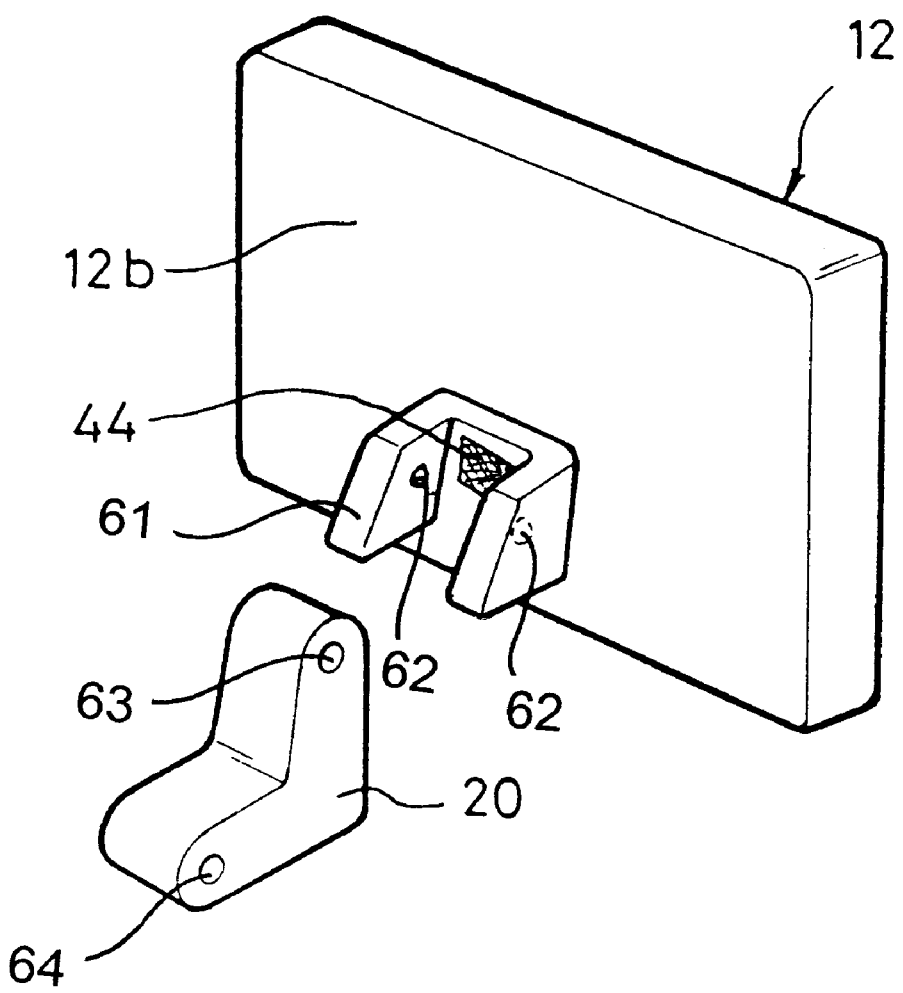
FIG. 3 is a rear perspective view of the LCD monitor of FIG. 1.

FIG. 2 shows fan 40 with a motor and blades (not shown) attached to intake aperture 43 in rear housing 12. Detailed explanation and drawings about the structure of fan 40 are omitted. Fan 40 is attached on the inner surface at the bottom of back cover 12 by a fastener. A fastener can be any one of a screw, a bolt, a clamp, and a rivet. Intake aperture 43 can be constructed in the form of many slots that give it a grill-ike appearance. Exhaust aperture 44 is positioned on the back of rear housing 12 for air to be blown out of the housing after cooling the main PCB. In order reduce potential contamination, intake aperture 43 is located on the lower portion of back cover 12 and exhaust aperture 44 is located in the back cover, as shown in FIG. 3. Attached to the rear housing is U-shaped member 61 that pivotally attaches to L-shaped member 20. A fastener is inserted through holes 62 in the U-shaped member and into hole 63 in the L-shaped member. The L-shaped member is pivotally connected to stand 30 via hole 64 in the L-shaped member.

Figure 4:
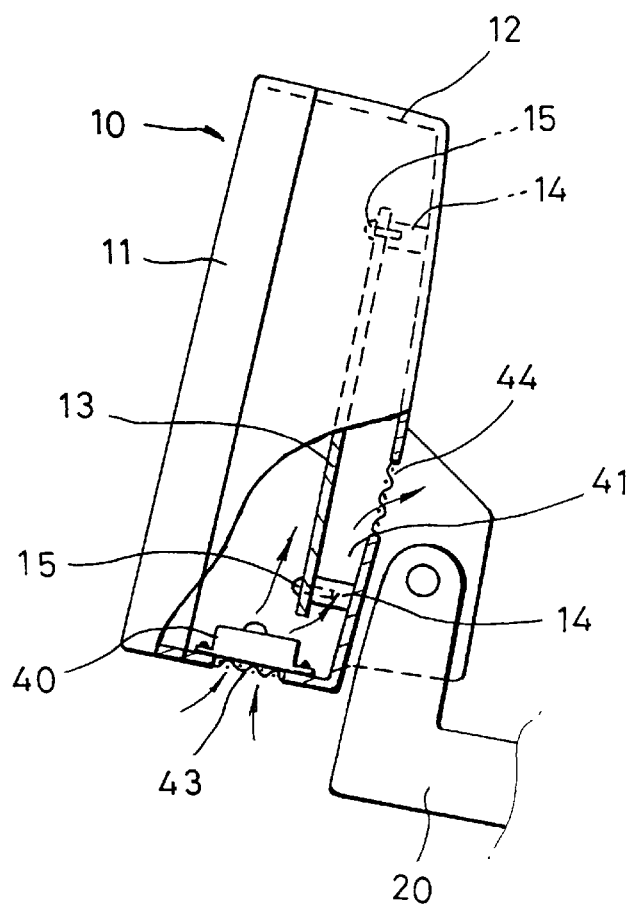
FIG. 4 is a cross-sectional side view of salient portions of the LCD monitor of FIG. 1.

FIG. 4 illustrates the operation of the fan and shows path followed by air as it is blown through the monitor's housing. When the motor is turned on, fan 40 starts to operate and blows air through the air flow passage 41. When the motor is turned off, fan 40 automatically stops operating.

Figure 5:
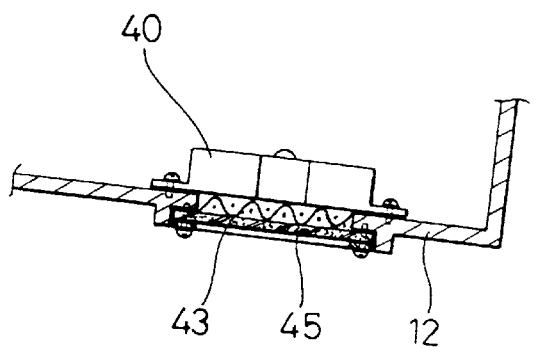
FIG. 5 is a side view of the intake aperture and fan in the LCD monitor of FIG. 1.

While the fan is operating, air is blown through intake aperture 43 and air flow passage 41. As the air passes over main printed circuit board 13 some of the heat generated by the PCB is transferred to the air. As the arrows of FIG. 4 illustrate, the air, and any heat absorbed by the air, is expelled from the monitor housing. FIG. 5 illustrates filter 45 mounted between intake aperture 43 and fan 40. This filter further reduces the amount of dust and contaminants that enter the monitor through the intake aperture. This prevents potential mis-operation of the circuit due to dust that is carried into the housing along with ambient air.

This allows the heat generated inside the monitor to be effectively discharged from the housing despite the small amount of space inside the monitor housing. Thus, the life time of the monitor is lengthened and the reliability of the monitor is correspondingly increased. The intake aperture and the exhaust aperture are located at the main body's bottom and back, respectively, and not directly seen in front, with the res It that the heat is effectively discharged while the external appearance of the monitor is not marred by apertures.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A display device capable of discharging heat generated by a plurality of internal circuitry, comprising:
    a housing including a front housing and a rear housing connected to said front housing;
    an intake aperture and an exhaust aperture formed on said rear housing;
    a plurality of bosses attached to an inner surface of a rear portion of said rear housing;
    said internal circuitry fastenable to said bosses;
    a flat-display panel monitor contained in said front housing; and
    a fan secured to said inner surface of said rear housing and positioned over said intake aperture, said fan bloving air through a gap between said internal circuitry and said rear portion of said rear housing and out of said housing through said exhaust aperture, thus discharging heat generated by said internal circuitry of said display device through said exhaust anerture.

2. The display device of claim 1, further comprised of said intake aperture being positioned in a bottom surface of said rear housing.

3. The display device of claim 1, further comprising a filter located between said intake aperture and said fan to reduce the level of contaminants entering the housing.

4. The display device of claim 1, further comprised of a base supporting said housing, comprising:
    a stand;
    an L-shaped member pivotally attached to said stand; and
    a U-shaped member attached to an outer surface of said rear portion of said housing, said U-shaped member pivotably engagable with said L shaped member.

5. The display device of claim 1, further comprising said exhaust aperture being located in said rear said housing.

6. The display device of claim 1, further comprised of said exhaust aperture having a filter to reduce the level of contaminants entering said housing.

7. The display device of claim 1, with said intake aperture and said exhaust aperture each comprising a plurality of slots forming a grill-like pattern.

8. The display device of claim 1, wherein said internal circuitry is located between said flat-display monitor and said rear housing.

9. The display device of claim 1, further comprised of said exhaust aperture disposed between said bosses.

10. The display device of claim 1, further comprised of said fan blowing air through a second gap between said internal circuitry and said flat-display panel monitor and out of said housing through said exhaust aperture.

11. A display device capable of discharging heat comprising:
    a front cover attached to a flat-display panel monitor;
    a back cover engaged with said front cover;
    a main printed circuit board mountable supported by said back cover and disposed between said back cover and said flat-display panel monitor;
    an intake aperture and an exhaust aperture located on said back cover; and
    a fan located at a bottom inner surface of said back cover, said fan blowing outsideairinto said display device through said intake aperture and expelling said air through said exhaust aperture after cooling said main printed circuit board.

12. The display device of claim 11, further comprising a filter for filtering the dust contained in outside air flowing into said display device through said intake aperture.

13. The display device of claim 11, further comprising:
    a plurality of bosses attached to an inner surface of said back cover; and
    said main printed circuit board fastenable to said bosses to form a channel through which air can flow between said main printed circuit board and a inner surface of said rear cover.

14. The display device of claim 13, further comprised of said exhaust aperture disposed between bosses.

15. The display device of claim 11, said intake aperture and said exhaust aperture each comprising a plurality of slots forming a grill-like pattern.

16. The display device of claim 11, further comprised of said air passing through any one of either a first air passage between said flat-display panel monitor and said main printed circuit board or a second air passage between said main printed circuit board and said back cover.

17. The display device of claim 11, further comprised of a stand moving a connecting member fixedly connected to said back cover.

18. The display device of claim 17, further comprised of aperture formed on said connecting member so as to discharging said air through said exhaust aperture of said back cover and said aperture of said connecting member.

19. A process of assembling a display device capable of discharging heat generated by a plurality of internal circuitry, comprising the steps of:

fastening a flat-display panel to a front cover;

fastening said internal circuitry to a plurality of bosses mounted on said rear cover and forming a first channel for air to flow through between said back cover and said internal circuitry, said rear cover having an intake aperture and an exhaust aperture;

securing a fan onto an inner surface of said rear cover over said intake aperture to blow air into said channel and out through said exhaust aperture; and fastening said front cover to said back cover and forming a second channel for air to flow through between said flat-display panel and said internal circuitry.

20. The process of claim 19, further comprising the step of inserting a filter over said intake aperture before securing a fan onto said inner surface of said rear cover.

21. The process of claim 19, further comprising the step of rotatably connecting said display device to a base;

said base including a stand, an L-shaped member pivotally attached to said stand, and a U-shaped member attached to an outer surface of said rear cover, said U-shaped member pivotably engagable with said L shaped member.

22. The process of claim 19, wherein said intake aperture and said exhaust aperture each is formed with a plurality of slots forming a grill-like pattern.

23. The process of claim 19, further comprised of the step of securing said fan on said rear cover to blow said air into said first and second channel and out through said exhaust aperture formed on said rear cover.

24. The process of claim 19, wherein said exhaust aperture located between said bosses mounted on said rear cover.

25. A display device, comprising:

a housing including a front cover and a rear cover fixedly connected to said front cover;

a flat-display panel attached to and contained in said front cover;

a printed circuit board fixedly connected to said rear cover and located between said flat-display panel and said rear cover, having a first air gap between said flat-display panel and said printed circuit board and a second air gap between said printed circuit board and said rear cover;

an intake aperture and an exhaust aperture formed on said rear cover; and a fan attached to said rear cover, generating a first air flow passing through said first air gap and a second air flow passing through said second air gap, discharging said first and second air flow through said exhaust aperture.

26. The display device of claim 25, further comprised of said fan positioned over said intake aperture.

27. The display device of claim 25, further comprised of said exhaust aperture located a central portion of said rear cover.

28. The display device of claim 25, further comprised of a filter attached to any one of either said intake aperture or said exhaust aperture.

29. The display device of claim 25, further comprised of a stand rotatably fixed to said rear cover and fixedly connected to a base supporting said stand and said display device.

30. The display device of claim 29, further comprised of an L-shaped member pivotally attached to said stand and fixedly attached to said rear cover.

31. The display device of claim 29, further comprised of an aperture formed on said stand so as to discharging said air through said exhaust aperture of said back cover and said aperture of said stand.

32. The display device of claim 25, further comprised of said exhaust aperture formed on a central portion of said rear cover.

33. The display device of claim 25, further comprised of at least one boss formed on an inner side of said rear cover, connecting said printed circuit board to said rear cover and forming said second air gap by the length of said boss.

34. The display device of claim 33, further comprised of said exhaust aperture disposed between said bosses.

* * * * *